United States Patent Office 3,140,153
Patented July 7, 1964

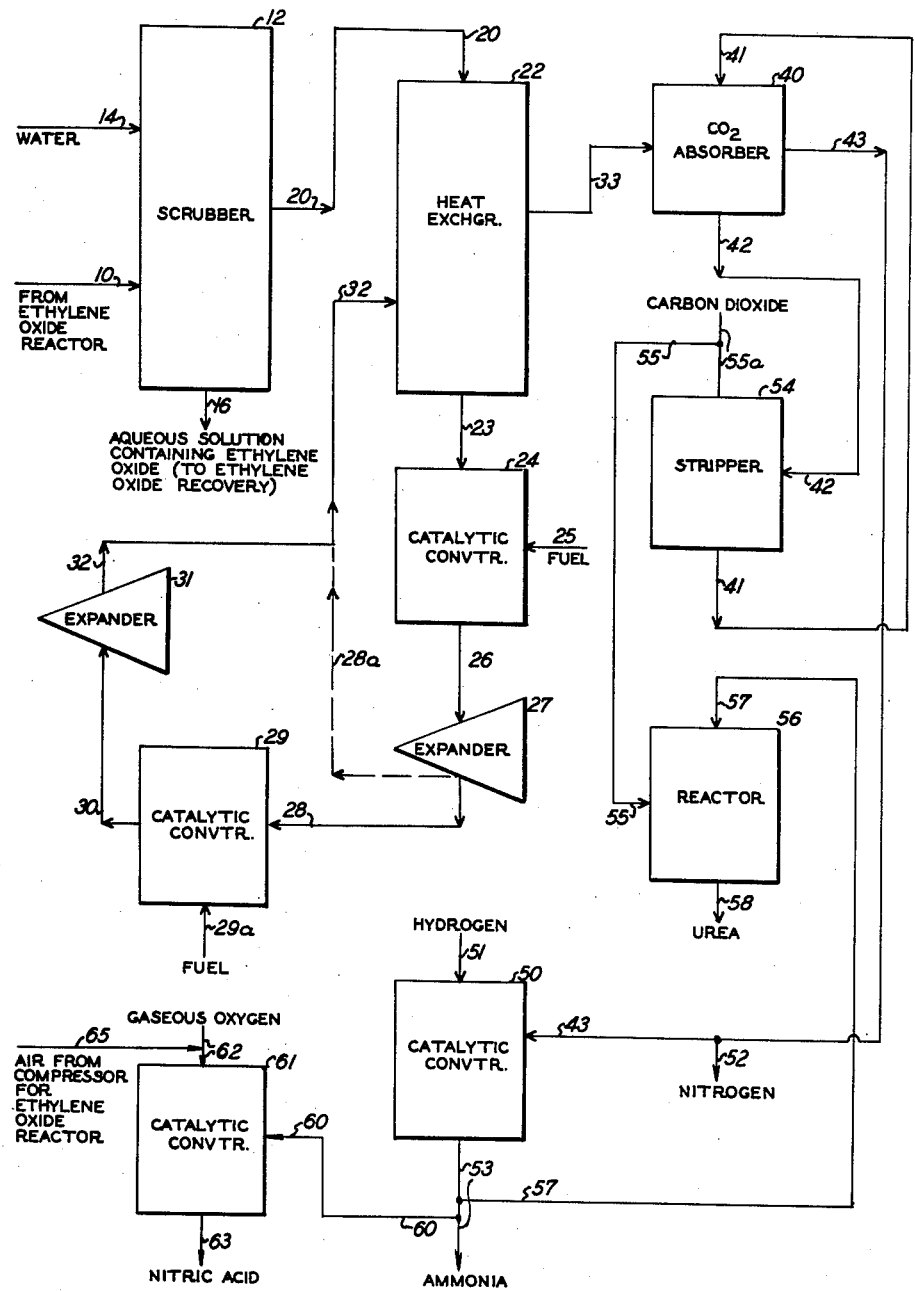

3,140,153
PROCESS FOR THE PRODUCTION OF ETHYLENE OXIDE AND NITROGEN
Harold A. Huckins, Jr., New Canaan, Conn., assignor to Halcon International, Inc., a corporation of Delaware
Filed Nov. 16, 1960, Ser. No. 69,699
1 Claim. (Cl. 23—220)

This application is a continuation in part of application Serial No. 727,162, filed April 8, 1958, now abandoned.

This application relates to the recovery of both the oxygen and the nitrogen values in air, more particularly to a process for recovering a part of the oxygen value by the preparation of an oxygenated organic compound, and the remainder thereof in production of energy by the total conversion of hydrocarbon fuel to carbon oxides and water, and recovering the nitrogen in substantially pure form.

The latter may be reacted chemically with hydrogen to produce ammonia, which in turn may be reacted with additional oxygen to produce nitric acid. Alternatively, the ammonia may be reacted with carbon dioxide (which may be obtained as a side product from the hydrocarbon fuel oxidation) to produce urea. In a preferred embodiment, the amount of energy produced from the total oxidation process is balanced with that required in an ethylene oxide production process with a view to obtaining maximum economy in the overall system.

Processes for the production of oxygenated organic compounds from the oxygen in air are known, such as the production of ethylene oxide which is described in detail in U.S. Patents 2,693,474, 2,752,362, 2,785,186, 2,777,862, 2,766,261 and 2,814,628.

Such process may include passing a gaseous reaction mixture containing 0.5 to 10% by volume of ethylene and 3 to 20% oxygen together with inerts in contact with a silver containing catalyst arranged in an elongated reaction zone at a temperature in the range of 150° to 400° C., the catalyst comprising essentially an intimate mixture of 3 to 30% by weight of finely divided silver and a promoter on an inorganic support material. The reaction zone may be tubular and of about 0.5 to 2 inches in diameter and of a length in the range of about 10 to 30 feet. The catalyst particles may be of an average diameter of at least about 0.2 inch and not greater than 50% of the diameter of the reaction zone. The gaseous mixture may be passed therein at a pressure in the range of 15 to 500 p.s.i.g. at a gaseous flow rate in the range of 5 to 60 feet per second, the residence time of the mixture in the zone may be in the range of about 0.1 to 6 seconds, and the pressure drop from end to end of the reaction zone may be in the range of 6 to 50 p.s.i.g. Ethylene oxide is recovered from the resulting reaction mixture.

Processes for the production of relatively pure nitrogen by physical means are also known. However, such processes require high capital costs and they use up energy. A large amount of nitrogen is produced in relatively impure form as a by-product of residue from partial oxidation processes. This nitrogen contains oxygen as an impurity. The art is confronted by the problem of producing ethylene oxide and the like partial oxidation products from air in an even more economical manner, as well as more economically utilizing the nitrogen produced as a by-product or residue in such processes.

The discoveries associated with the invention relating to solution of the above problems and the objects achieved in accordance with the invention as described herein include the provision of:

A process for recovering substantially pure nitrogen from a gaseous mixture containing nitrogen and carbon dioxide together with oxygen and carbonaceous material, the latter two being in stoichiometric ratio for conversion to carbon dioxide, which process comprises catalytically reacting this mixture in vapor phase and at elevated temperatures of at least about 600° F. to produce carbon dioxide, an increase in temperature and substantially consume the gaseous oxygen, and separating the carbon dioxide and any water present, whereby substantially pure nitrogen is obtained as a residue;

Such processes wherein the gaseous mixture is preheated to about 600° to 800° F., catalytically reacted so as to raise its temperature to about 1100° to 1500° F. expanded and cooled to a temperature of about 700° to 1000° F., while performing work, and utilizing residual heat therein to preheat the inlet initial gaseous mixture;

Such processes wherein the initial gaseous mixture contains a stoichiometric excess of oxygen and the required amount of additional gaseous hydrocarbon or other fuel is added prior to the preheating step;

Such processes wherein substantially pure carbon dioxide is recovered;

Such processes wherein the initial gaseous mixture is obtained at no added cost as an effluent from the reaction of ethylene with air to produce ethylene oxide;

Such processes wherein the nitrogen is reacted with hydrogen to produce ammonia;

Such processes followed by oxydation of the ammonia to produce nitric acid;

Such processes followed by reaction of the ammonia with carbon dioxide to produce urea;

And other objects which will be apparent as details or embodiments of the invention are set forth hereinafter.

The attached drawing is a flow diagram illustrating one embodiment of the present invention.

In order to indicate still more fully the nature of the present invention, the following examples of typical procedures are set forth in which parts and percent mean parts and percent by weight, respectively, unless otherwise indicated, it being understood that these examples are presented as illustrative only and are not intended to limit the scope of the invention.

*Example I*

Referring to the figure, a gaseous feed mixture resulting from the catalytic oxidation of ethylene and comprising ethylene oxide, carbon dioxide, nitrogen and other inerts, oxygen and unconverted ethylene (and ethane and the like impurities of the ethylene feedstock) is introduced into feed inlet 10 of a main scrubber 12 comprising one or more scrubber columns (a single scrubber column being shown and described herein). Ethylene oxide and a portion of the gaseous inerts are absorbed in a solvent, preferably water, which is introduced into the upper end of main scrubber 12 through scrubber water feed line 14. The resulting liquid effluent comprising water, ethylene oxide (about 1 wt. percent) and some inerts is conducted from the bottom of the main scrubber 12 through a connecting line 16 to an ethylene oxide recovery system. The off gas or gaseous effluent from the main scrubber 12, contains nitrogen, carbon dioxide, unreacted ethylene (and ethane and the like impurities), and oxygen, and leaves the main scrubber through duct 20. This gas may be obtained from one or more ethylene reactors (not shown).

The off gas or effluent containing nitrogen, carbon dioxide, ethylene and oxygen is passed via line 20 into heat exchanger 22 wherein the gases are preheated and then passed via line 23 to the catalytic converter 24. Usually the gas contains a stoichiometric excess of oxygen, and additional fuel such as hydrocarbon gas (methane, ethane, propane, etc.), liquid (kerosene) or finely divided coal is introduced through line 25 so that the mixture contains a stoichiometric or approximately stoichiometric ratio of carbonaceous material and oxygen for converting the carbonaceous material to carbon dioxide. A catalytic oxidation or combustion occurs in converter 24 increasing the temperature of the exit gas, which gas is passed through line 26 into expander or turbine 27 (for the performance of work). The gases from the expander exhaust may be passed through line 28 to a second catalytic converter 29 where additional fuel may be added through line 29a if needed for complete removal of oxygen and the process is repeated raising the temperature of the exit gas, which gas may be passed from the converter (wherein it is again reheated) via line 30 to the second expander 31 (for the performance of additional work). The exhaust gas from the last turbine or expander used is passed via line 32 into the heat exchanger 22 to preheat the incoming gaseous mixture, and the cooled exhaust gas leaves the exchanger via line 33. If a single converter is used, the gas is passed via line 28a to line 32. Additional stages of catalytic conversion and power recovery in a gas expander could be included if desired.

This gaseous mixture is passed via line 33 to a carbon dioxide absorber 40 wherein the mixture is contacted by an absorbent (such as hot aqueous potassium carbonate solution) introduced via line 41. The absorbent (rich in carbon dioxide) is removed via line 42 and passed to a carbon dioxide stripper 54 where the absorbent is heated and the carbon dioxide stripped out, and purified absorbent is recycled back to the absorber 40 via line 41. The carbon dioxide may be withdrawn via line 55a. The effluent gas from absorber 40 is nitrogen which is substantially free of oxygen (containing less than 0.5 mol percent oxygen), and is suitable for use as an inert gas or for a chemical reactant. It may be passed to storage via lines 43 and 52.

The nitrogen (one part by volume) may be introduced into a catalytic converter 50 via line 43 together with three parts of hydrogen introduced via line 51, and reacted over an iron catalyst at elevated temperature (e.g. 400° to 650° C.) and pressure (e.g. 200 to 1000 atm.) and converted to ammonia. The ammonia product is withdrawn via line 53 and may be passed to storage. Alternatively, this ammonia may be passed via line 60 to a nitric acid conversion system 61 where it is oxidized by means of gaseous oxygen (fed through line 62) to yield nitric acid, in known manner. The acid is withdrawn via line 63. In another alternative, the ammonia may be passed via line 57 to a urea conversion system such as reactor 56 wherein 2 parts of ammonia are reacted with one part of carbon dioxide (supplied from the above described recovery system via line 55) at an elevated temperature (180° to 210° C.) and pressure (1500 to 4000 p.s.i.g.) to form urea, in known manner. The latter is withdrawn via line 58.

*Example 2*

The procedure of Example 1 is repeated except that the gaseous feed mixture is obtained from an ethylene oxide system involving two reactors, the feed to the first reactor contains about 4.5 to 5.0 percent ethylene, about 6.0 oxygen, about 7 percent carbon dioxide and the remainder is essentially nitrogen with a small amount of water vapor. The first reactor contains one or more vertical reaction tubes about one inch in diameter packed with 20 to 30 linear feet of a silver catalyst on an inert support. The flow rate therein is at about 500 cubic feet per hour, the reaction temperature being about 290° C. and the reaction pressure being about 10 atmospheres gage.

After scrubbing out the ethylene oxide from the reaction product, about one third of the gas is purged out of the system and used to make up the feed to a secondary reactor and the remainder recycled to be used in making up the feed to the primary reactor. The feed to the secondary reactor contains about 3 percent ethylene, about 6 percent oxygen, about 7 percent carbon dioxide and the remainder is essentially nitrogen with a small amount of water vapor. The secondary reactor is similar to the primary reactor. However, the reaction conditions therein are somewhat more severe so that approximately 50 percent of the ethylene is consumed.

This procedure is especially desirable from the viewpoint of industrial efficiency for the production of ethylene oxide. For this purpose, the catalyst support may comprise fused alumina, magnesia, mullite, or Carborundum. It may contain about 3 to 30 percent silver, by weight.

By charging low purity ethylene feed, the exit gas is high in hydro-carbon which gives more heat, more power and more carbon dioxide for this less expensive feed.

The ethylene gas used may contain up to about 60 moles of paraffins of 1 to 2 carbon atoms in the molecule, preferably less than 10 moles per 100 mols of ethylene. A halogen containing inhibitor, such as, chlorinated biphenyl or ethylene dichloride vapor, is used to counteract the selectivity lowering effect of the paraffins and the amount thereof is in the range of 1 to 300 parts per million of feed gaseous mixture; the higher amounts of paraffins requiring the higher amounts of the chlorinated vapor.

The silver catalyst employed in the foregoing examples is regarded as particularly effective and desirable. Other silver containing catalysts may be used, however, such as those known to the art. The reaction mixture, temperature, catalyst, and contact time or space velocity of the gaseous mixture are interrelated and suitable combinations thereof are selected to give the desired optimum output and concentration of ethylene oxide in the exit gas.

If the ethylene gas contains an appreciable proportion of paraffins, the process of the present invention is especially adapted for recovery of the fuel value therein. Even with the excess of paraffins, the ethylene oxide reaction is preferably run with an excess of oxygen, so that additional carbonaceous material has to be introduced (through line 25) for purposes of the oxygen consuming reaction (which occurs in converter 24).

*Example 3*

The procedure of Example 2 is repeated except that the ethylene feed gas is obtained by cracking ethane to produce ethylene as well as hydrogen and other lower boiling hydrocarbons. The hydrogen is separated by fractionation and used in the subsequent ammonia synthesis. The remaining gas is used to make up feed for the ethylene oxide reactors.

In this way a very marked upgrading of the initial crude ethane is achieved, with the production of a variety of commercially valuable products.

For plant economy, the air compressor (not shown) used for the ethylene oxide reaction system (not shown) may be used to supply air (at an intermediate stage of compression at about 5 to 15 atm. pressure) via lines 65 and 62 to converter 61 for making the nitric acid. This combination of the ethylene oxide reaction system with the nitric acid reaction system markedly reduces the capital as well as the manufacturing costs for both materials.

For the manufacture of ammonia, it is desirable to preserve the high pressure of the nitrogen gas. This may be done by replacing expander 27 by a heat exchanger (not shown) to recover heat or energy without lowering the pressure of the gas. A higher overall efficiency for the manufacture of ammonia is achieved thereby.

It is indeed surprising that such a partial oxidation system may be enlarged at an economically attractive, low additional cost so as to include the production of energy, inert gas, carbon dioxide reactant, nitrogen reactant, ammonia, urea, nitric acid, and the like, at economically attractive low additional manufacturing costs.

In view of the foregoing disclosures, variations and modifications thereof will be apparent to one skilled in the art, and it is intended to include within the invention all such variations and modifications except as do not come within the scope of the appended claim.

What is claimed is:

A combined process for the production of ethylene oxide and high purity nitrogen which comprises: contacting ethylene with an oxygen and nitrogen containing gas; withdrawing a stream containing ethylene oxide and a gaseous reaction mixture containing nitrogen, oxygen and combustible carbonaceous material, said oxygen being present in more than stoichiometric amounts in relation to said carbonaceous material; separating said ethylene oxide from said gaseous reaction mixture; adding additional carbonaceous materials so that the total carbonaceous material is stoichiometrically equivalent to said oxygen present; preheating said gaseous reaction mixture to about 600° F.; catalytically reacting said gaseous mixture in the vapor phase so as to raise its temperature to about 1100° to 1800° F., thereby converting said carbonaceous materials to carbon dioxide and water and substantially consuming said oxygen; expanding and cooling the resultant mixture to a temperature of about 765° to 1000° F., while performing work; utilizing the residual heat to preheat said resultant mixture is the aforesaid preheating step; separating said carbon dioxide and water from said resultant mixture; and leaving a residue of substantially pure nitrogen.

References Cited in the file of this patent

UNITED STATES PATENTS

| | | |
|---|---|---|
| 1,154,172 | Brownlee | Sept. 21, 1915 |
| 2,314,827 | Hortvet | Mar. 23, 1943 |
| 2,381,696 | Shapleigh | Aug. 7, 1945 |
| 2,384,065 | Balcar | Sept. 4, 1945 |
| 2,610,106 | Gray | Sept. 9, 1952 |
| 2,693,474 | Egbert | Nov. 2, 1954 |
| 2,740,693 | Pomykala | Apr. 3, 1956 |
| 2,944,396 | Barton | July 12, 1960 |